US006428304B1

(12) United States Patent
Sartor et al.

(10) Patent No.: US 6,428,304 B1
(45) Date of Patent: Aug. 6, 2002

(54) APPARATUS FOR THE PREPARATION OF PREFORMS IN MANUFACTURING PLANTS FOR THE PRODUCTION OF BOTTLES AND CONTAINERS OR PRODUCTS OF VARIOUS KIND (75) Inventors: Adriano Sartor; Antonio Da Rios, both of Conegliano (IT)

(73) Assignee: Unitek S.r.l., San Vandemiano (TV) (IT)

( * ) Notice: Subject to any disclaimer, the term of this patent is extended or adjusted under 35 U.S.C. 154(b) by 0 days.

(21) Appl. No.: 09/416,211

(22) Filed: Oct. 8, 1999

(30) Foreign Application Priority Data

Oct. 13, 1998 (IT) .......................................... TV98A0137

(51) Int. Cl.⁷ .......................... B29C 49/06; B29C 49/32; B29C 49/64
(52) U.S. Cl. ........................ 425/526; 264/537; 425/533; 425/534
(58) Field of Search ............................... 425/533, 526, 425/534; 264/537

(56) References Cited

U.S. PATENT DOCUMENTS 3,986,806 A * 10/1976 Beyerlein et al. ........... 425/533
4,197,073 A * 4/1980 Rees et al. .................. 425/533
4,604,258 A * 8/1986 Valyi .......................... 425/533
5,051,227 A * 9/1991 Brun, Jr. et al. ............ 425/533
5,501,593 A * 3/1996 Marcus ....................... 425/533
5,589,130 A * 12/1996 Takada et al. ............... 425/533
6,095,788 A * 8/2000 van Manen et al. ........ 425/526
6,156,258 A * 12/2000 Takada et al. ............... 425/533

* cited by examiner

Primary Examiner—Robert Davis (57) ABSTRACT

Preform preparation apparatus for manufacturing plants for the production of bottles and containers, as well as products of various kind, comprising moulding means provided with machine tools for the preparation of a mass of molten plastic material, in view of obtaining a plurality of preforms therefrom, possible preform loading means and preform conveying means, along with means for cooling down and processing the same preforms in view of obtaining the desired finished products, in which said moulding means comprise at least a first and a second moulding means (26, 27) provided with plungers or punches (28) and at least a third moulding means (22) provided with moulding cavities (25), all of them communicating with said machine tools, said first and second moulding means (26, 27) being capable of selectively coupling with said third moulding means (22) for forming said preforms, in such a manner that, in the situation in which one of said first and second moulding means (26, 27) is coupled with said third moulding means (22), the other one carrying the related moulded preforms is subjected to the action of said cooling means (31).

1 Claim, 8 Drawing Sheets

APPARATUS FOR THE PREPARATION OF PREFORMS IN MANUFACTURING PLANTS FOR THE PRODUCTION OF BOTTLES AND CONTAINERS OR PRODUCTS OF VARIOUS KIND

DESCRIPTION

The invention refers to an apparatus for the preparation of preforms to be used in manufacturing plants provided for the production of bottles and containers or products of various kind, such an apparatus being adapted to prepare the preforms in a manner that is not only quick, but also different from the traditional one, in view of the subsequent utilization of said preforms for the production of said products therefrom.

Plants for producing bottles and containers of various kind through the use of plastic materials such as PET, PEN and thermoplastic materials of various kind are generally known in the art to substantially comprise a preform forming station that is formed by at least a machine tool such as for instance a screw extruder, into which the plastic material is fed in pelletized form for being first heated up to its melting temperature, or melt point, and then injected by means of moulding presses through injection conduits communicating with moulds formed by a group of cavities and a group of plungers, or punches, thereby filling the various cavities of each such mould in view of in this manner forming respective preforms to be eventually used for the production of the above cited containers or bottles.

These plants further comprise stations in which the so moulded preforms are sequentially allowed to cool down to temperature values below the melting temperature of the respectively used thermoplastic materials, are allowed to stabilize at the respectively reached temperature, and are finally subjected to a blow moulding process, in which moulding tools and equipment of a traditional type are generally used, in view of thereby producing the bottles or containers to the desired shape and size, wherein said bottles or containers are finally ejected from the plant in a traditional manner and packaged for shipment to the customers.

In the plants of the above mentioned kind, the moulds that are currently used in the above cited preform forming phase are displaced, during the moulding phase, in that the group of plungers or punches, which are generally movable, are caused to move against the group of cavities, which are generally of the stationary type, during the mould clamping phase, whereas, at the end of the moulding cycle, said group of plungers or punches are temporarily moved away from said group of cavities in order to enable the so formed preforms to be removed from said group of cavities and undergo the subsequent cool-down and temperature stabilization phases preceding the final blow moulding of the same preforms into the final products, ie. bottles or containers of various kind, after which the above cited groups of plungers or punches and cavities of the preform forming moulds are again moved against each other for a new preform forming cycle.

This sequence of opening and clamping movements of the moulds, along with the accompanying preform cool-down phases, unavoidably brings about a certain extent of down-time during which the same moulds are practically idle and the molten plastic mass cannot be injected thereinto. On the other hand, said moulds cannot be provided with sizes that are in excess of well defined limits, in view of being able to increase the number of their cavities and, therefore, the number of pieces that can be produced in each moulding cycle, since such an oversizing would unavoidably make it much more complicated, if not even impossible, for said moulds to be handled in their opening and clamping movements representing the actual circumstances in which the overall operating times are relatively long and determine productivity levels that cannot be improved any further.

It therefore is a purpose of the present invention to do away with the drawbacks and the limitations deriving from the use of the present, prior-art tools and plants for moulding bottles and containers of various kind, by providing a preform preparation apparatus for bottle or container manufacturing plants which is so designed as to be able to significantly increase the output capacity of said moulds and plants during each moulding cycle thereof, while making use of normally sized moulds provided with a same number of moulding cavities as the moulds that are currently used for the same task.

Such an apparatus is provided with the construction features that are substantially described with particular reference to the appended claims. The invention will anyway be more clearly and readily understood from the description that is given below by way of non-limiting example with reference to the accompanying drawings, in which:

The above listed Figures are shown to schematically illustrate a preform preparation apparatus, which is generally indicated at 10, as used either in combination or not with manufacturing plants of the so-called single-stage or two-stage type for the production of plastic bottles or containers of various kind, to the purpose of preparing such preforms that are subsequently processed andconverted into bottles or containers in said manufacturing plants.

To this purpose, FIGS. 1 and 2 can be noticed to schematically illustrate two manufacturing plants of the single-stage type for the production of bottles of various kind by using plastic materials such as PET and PEN and thermoplastic materials of various kind, in which each such plant is shown to essentially comprise a moulding station 11 for the preparation of the preforms, which is provided with the features that will be more exhaustively described in the following description, and a series of subsequent stations for cooling down said preforms to pre-determined temperatures and conditioning them at said temperatures, as well as eventually blow moulding said preforms in view of producing said bottles or containers to the required or desired shapes and sizes, under subsequent ejection of the so produced bottles or containers from the plant and packaging of said products for final shipping to the customers.

Figure 1:
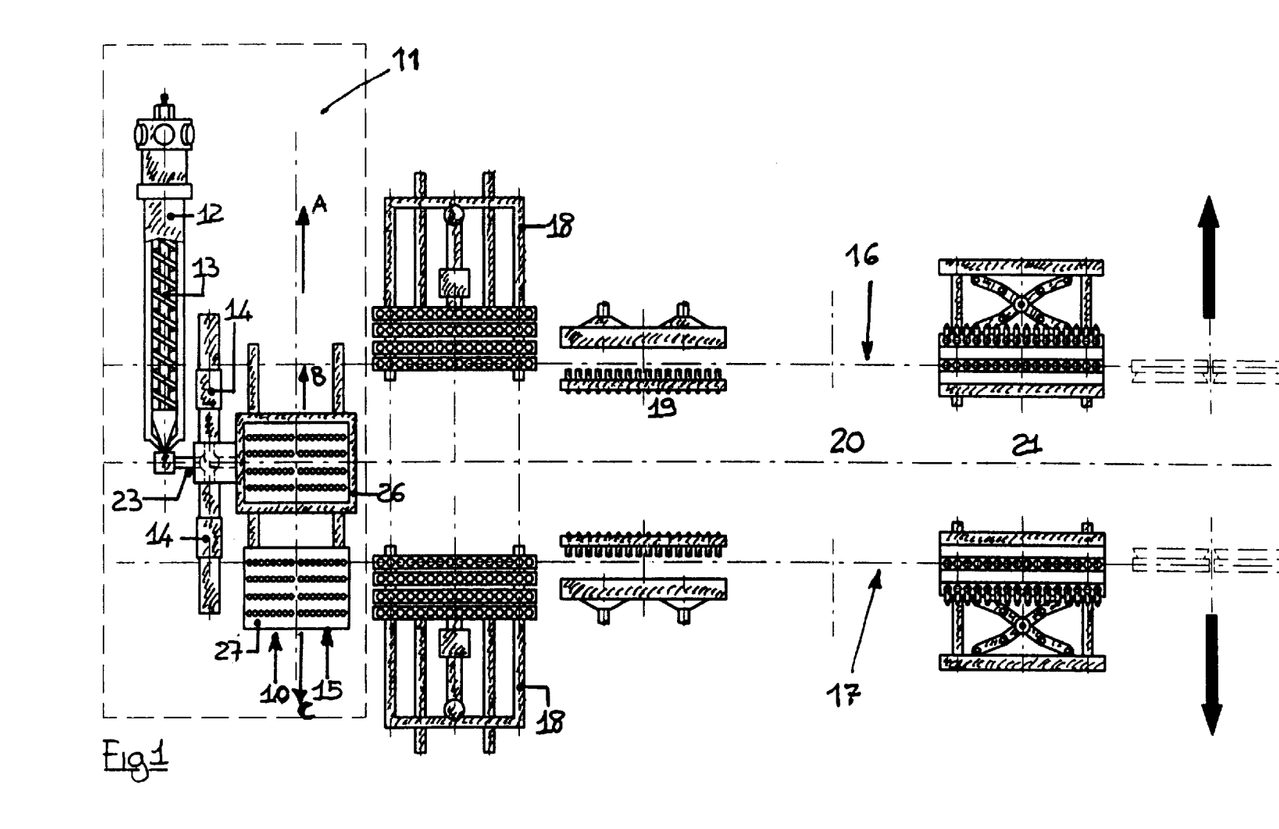
FIG. 1 is a schematical view of the apparatus according to the present invention, as applied to a first kind of plant for the production of bottles or containers.

In particular, FIG. 1 can be noticed to illustrate a first type of a traditional plant for the production of bottles or containers, in which the moulding station 11 is constituted by at least a machine tool such as for instance a screw extruder 12, into which the materials used in the production of the preforms is fed in the form of pelletized plastic material. Such a plastic material is then gradually heated up and fed forwards along the inner pastication or melting chamber 13 of the extruder, thereby obtaining a mass of mixed molten plastic that is then conveyed through a traditional injection channel 14 communicating with the extruder 12, from which it is then injected into the preform preparation apparatus 15 according to the present invention which is arranged close to and in communication with said injection channel 14 and is made with the features that will be more exhaustively described further on.

The bottle production plant being considered here is further provided with at least two separate production lines 16 and 17 arranged close to each other in a mutually parallel arrangement, each one of which is formed by at least a loading unit 18 of a traditional type arranged in a position that is quite close to the preform preparation apparatus 15, on which the preforms prepared with the above cited preform preparation apparatus are loaded, and which provides for said preforms to be then transferred onto a conveyor (not shown) that carries them in a sequence through traditional preform cooling-down and preform conditioning stations 19, temperature stabilization stations 20 and blow moulding stations 21, in which corresponding bottles or containers are obtained from said preforms, until a final ejection station is reached where the so obtained bottles or containers are eventually unloaded from the plant.

As clearly illustrated in FIGS. 3 to 6, such a preform preparation apparatus is essentially constituted by at least a main moulding tool formed by a mould 22 containing the various cavities for the preparation of the preforms from which said bottles or containers have then to be obtained, said mould being arranged and appropriately fastened on a side of the injection channel 14 so that the injection nozzle 23 of the latter is in a coinciding arrangement with at least an injection gate or runner 24 of the same mould, which is in turn communicating with the various moulding cavities 25 of said main mould.

The preform preparation apparatus according to the present invention is further constituted by at least a pair of moving moulds 26 and 27, which are similar to each other, are provided with plungers or punches 28 facing the corresponding cavities 25 of the main mould 22, and are adapted to compliably fit into said cavities so as to thereby define the cavities that can be filled with molten plastic material for the preparation of the preforms intended to be then blow moulded into bottles or containers.

Such moving moulds 26 and 27 are in an advantageous manner applied in a position above the main mould 22 and are driven by therewith associated guiding and handling mechanisms of a per se known type (not shown in the Figures) so as to enable them to be displaced separately with respect to the main mould with two different movements, ie. with a first movement along a rectilinear longitudinal direction A which is axially aligned with the injection channel 14 and the main mould 22 therebelow, and by means of which said moving moulds are displaced at the same time in either one or the other one of the two mutually opposed directions B and C so as to selectively arrange either one or the other one of the same moulds in correspondence with the main mould therebelow, and a second movement in which they are displaced along a rectilinear vertical direction D orthogonally with respect to said main mould, in either one or the other one of the two mutually opposing directions E and F, so as to respectively move them from a raised, therewith coinciding and upward displaced position to a lower position coinciding with and approached to the main mould 22 therebelow, in which both coinciding moulds are therefore mutually coupled, and in which the molten plastic material is then injected in said moulds for the preparation of the related preforms, and to then move them again into said raised position thereof, thereby separating them from the main mould 22 therebelow, respectively.

These two movements are mutually synchronized so as to be able to first move one of said moving moulds into such a position coinciding with and raised from the stationary main mould 22 therebelow, and then lower said mould in the direction E until it is brought into coupling with said main mould, while at the same time keeping the other moving mould in a raised position non-coinciding with said main mould, and subsequently, at the end of the moulding cycle in which the related preforms have so been prepared, raising again the first moving mould in the direction F, to thereby separate it from the main mould 22 therebelow, and bringing it first into its original position and then displacing it along the longitudinal direction A so as to arrange it in a non-coinciding position with respect to the main mould 22 therebelow, as well as to displace the other moving mould along the same longitudinal direction into its raised position coinciding with the main mould 22 therebelow, so that said other moving mould can therefore be first lowered and brought into coupling with saif main mould therebelow for starting and performing a new preform moulding cycle, and then raised again at the end of the related preform moulding cycle, wherein these operational sequences are continuously repeated in the same manner and under the same conditions until the whole desired or requested amount of preforms have eventually been produced.

In this manner, the main mould 22, in which said preforms are so moulded, is brought selectively into contact with either one or the other of the so provided moving moulds or, if required, even with further moving moulds that may possibly be mutually associated according to the same principles and criteria as described above, so that while preforms are so moulded in a moulding cycle being performed in the mutually coupled moulds, the other moving mould, with the previously moulded preforms still coupled to the related plungers or punches, is actually exposed to the atmosphere, so that these preforms can be removed therefrom and transferred to the loading unit 18 of the therewith associated production line in view of being subsequently allowed to undergo the necessary cool-down, conditioning and final blow moulding phases for forming the corresponding final products in the form of bottles or containers.

In particular, the removal of the preforms from the respective moving mould is carried out by means of appropriate tools of a traditional type in a relatively short time so as to clear said mould and make it ready to be brought again into coupling with the main mould for moulding further preforms with cycle times that are extremely short, so that the operational sequence of the apparatus according to the present invention actually enables the amount of pieces moulded in a same period of working time to be significantly increased with respect to the currently used moulding equipment and tools.

According to the present invention, the moving moulds can of course can be mounted, further to said vertical superposed position that has been illustrated by way of example in the above description, also in different positions, such as for example in a horizontal or an inclined position with respect to the main mould, provided that each one of said moulds are anyway able to couple with said main mould in view of moulding the preforms, without thereby departing from the scope of the present invention.

Reference should be made now to FIGS. 3 to 6, which illustrate the various working positions into which the apparatus according to the present invention is brought throughout a preform moulding cycle, and in which the moving moulds 26 and 27 can be noticed to be provided on top with appropriately designed, common-use guiding and handling mechanisms 29 that enable them to be contemporaneously displaced along the longitudinal direction A from one to the other one of their working positions, when both of them are in their raised position, and that on the other hand also enable only the moving mould that is from time to time positioned in coincidence with the main mould 22 therebelow to be displaced along the direction D from one position thereof to the other one, while the other moving mould is in this case always maintained motionless in its raised position non-coinciding with said main mould.

Figure 3:
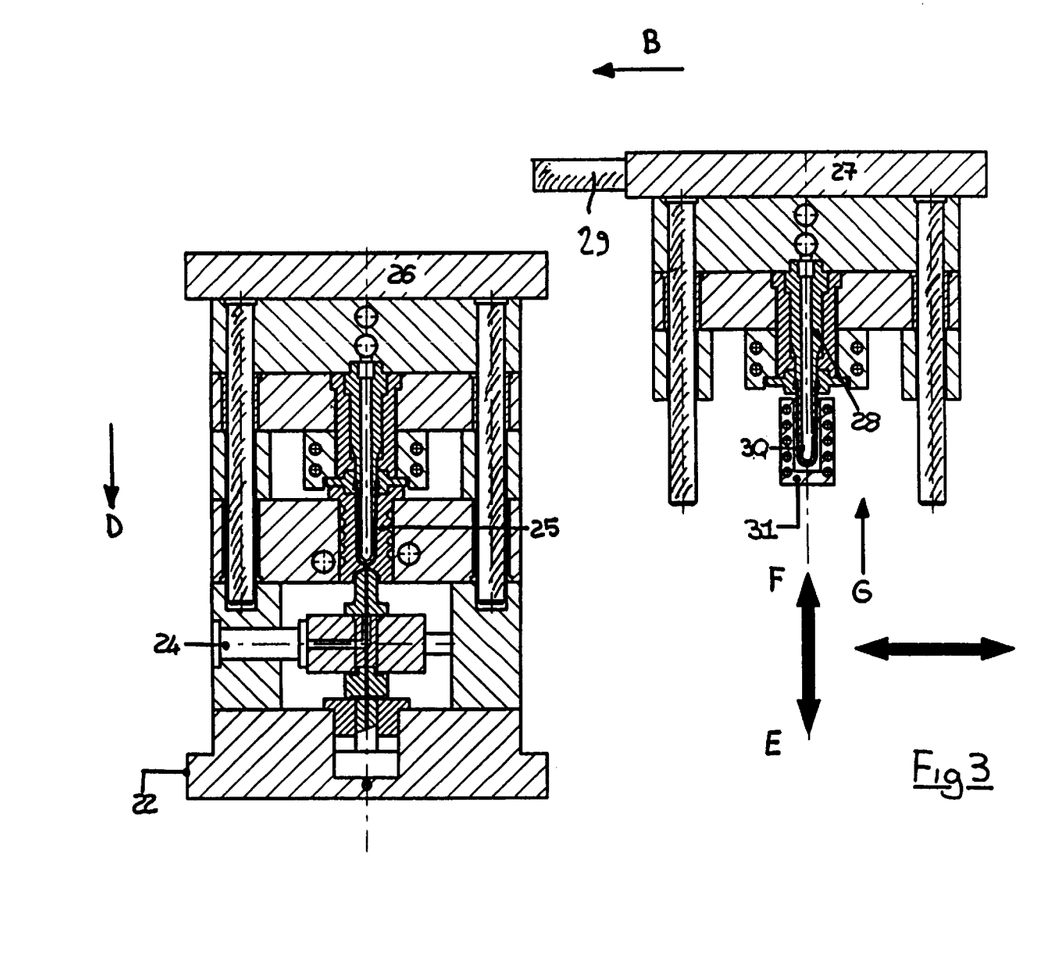
FIG. 3 is a schematical, front cross-sectional view of the preform preparation apparatus according to the present invention in a first embodiment thereof, as shown in a condition in which it is displaced into a first operational position thereof.

FIG. 3 can be noticed to illustrate the mould assembly that is displaced in the position in which the first moving mould 26 is arranged so as to enable the related preform moulding cycle to be carried out, while the second moving mould 27 is still carries the previously moulded preforms associated therewith. Under these circumstances, then, said first moving mould turns out to be positioned in correspondence of the main mould 22, and is lowered and coupled with said main mould, thereby enabling the related preforms to be moulded within said moulds, while the second moving mould 27 remains in turn raised in a position position that is laterally displaced with respect to and non-coinciding with said main mould, in which said plungers or punches 28 along with the related, still therewith coupled preforms 30 are exposed to the atmosphere under resulting cool-down of all said preforms.

In this operational condition, the loading unit 18 (not indicated) of the associated production line of the plant is raised in the direction G, so that its cavities (not indicated), provided to accomodate said preforms, are brought into coincidence and are therefore able to couple with all said prepared preforms 30 and the related plungers or punches 28, in order to then remove all such preforms therefrom and transfer them into said cavities of said loading unit.

In an advantageous manner, in view of reducing the time required to cool down the preforms, the latter are either inserted into appropriate cooled metal containers 31 provided in the loaded unit 18 and sized so as to be able to removably accomodate the same preforms, and provided with large surfaces in order to be able to effectively dissipate the heat from the preforms and thereby reduce the temperature thereof, or may also be associated to cooling means of various kind and conformation in view of obtaining the same results.

Figure 4:
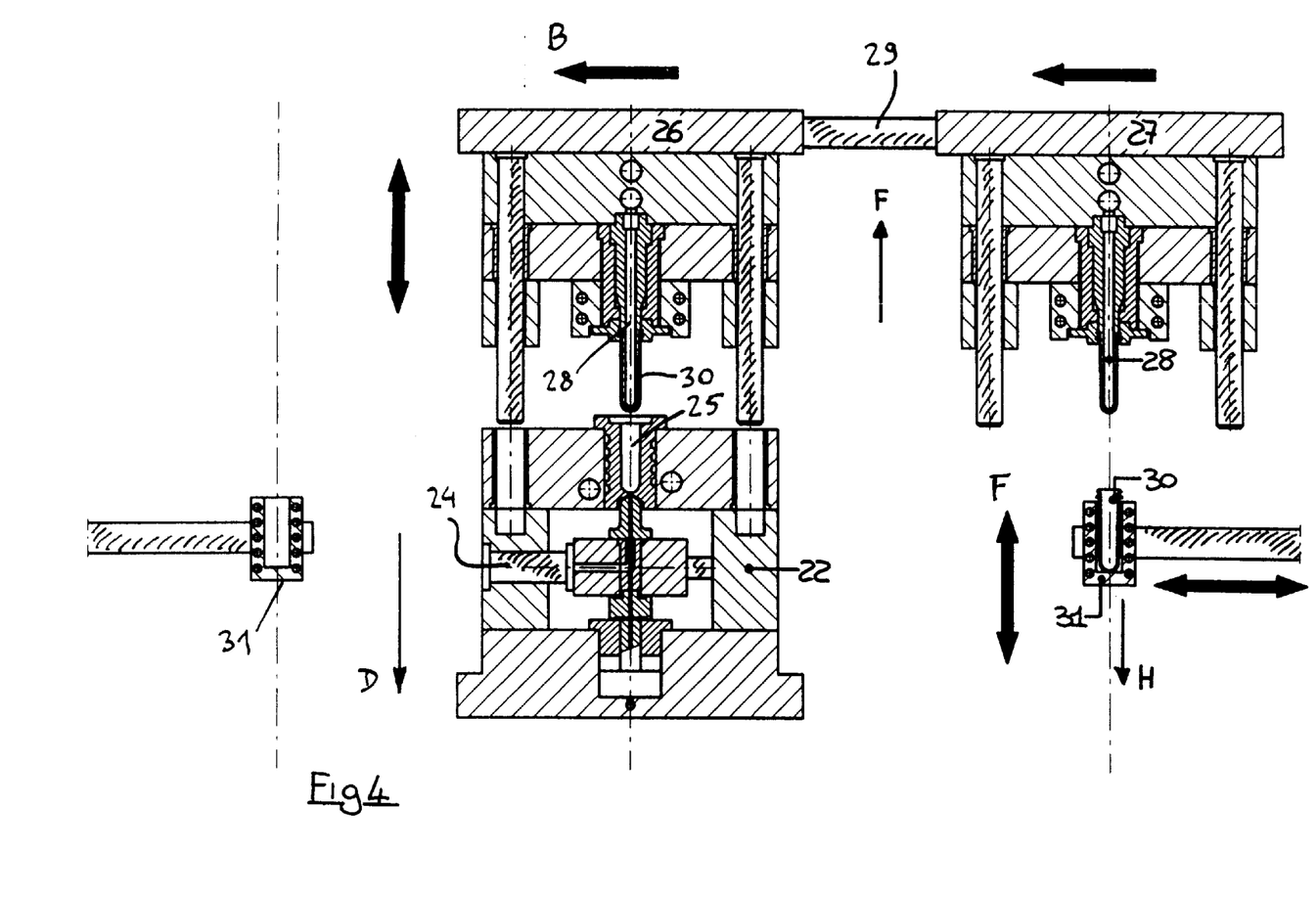
FIGS. 4, 5 and 6 are schematical, front cross-sectional views of the apparatus of FIG. 3, as shown in conditions in which it is displaced into three further operational positions.

In the next operational position illustrated in FIG. 4 it can be noticed that the first moving mould 26 is raised at the end of the moulding of the related preforms, while the same preforms remain therefore coupled, ie. attached to the corresponding plungers or punches 28, thereby moving back to the same level as the second moving mould 27 that has in the meanwhile dwelled in the same position it had before. At the same time, the loading unit 18 is in turn lowered along the direction H under resulting release of the preforms 30 from said moving mould and insertion thereof in the cooled containers 31 which are housed in the cavities of the same loading unit.

Visible in the same Figure there are also the cooled containers 31 of the other loading unit of the plant, ie. the one that is associated to the other production line of the plant, which is displaced into the same lowered position of the previous loading unit, thereby getting arranged in coincidence of the position into which the first moving mould 26 will be moved, so as to be in this way able to receive the just moulded preforms and transfer them in the same manner and according to the same principles as described above.

Figure 5:
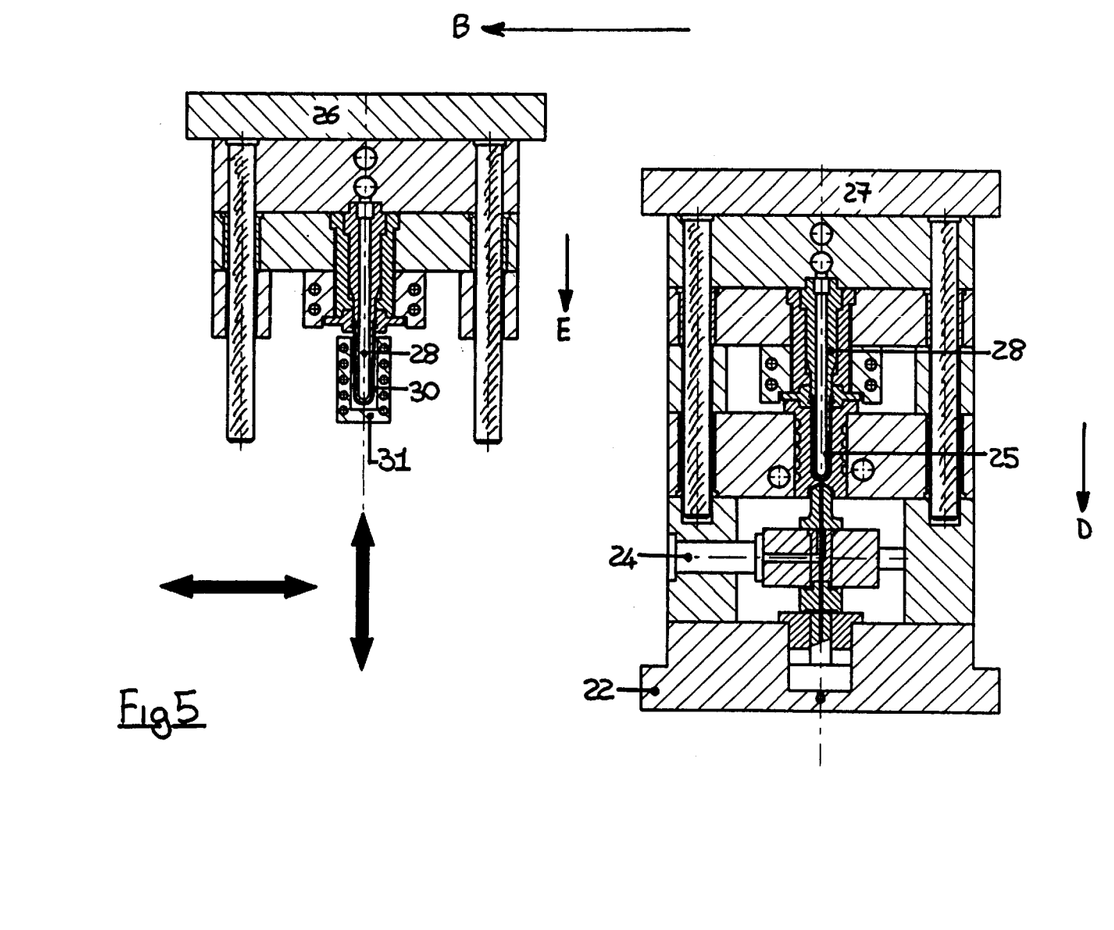

In the next operational situation illustrated in FIG. 5 it can be noticed that both moving moulds 26 and 27 have been displaced at the same time along the longitudinal direction A, in the direction B, so as to move the first moving mould 26 into a raised position non-coinciding with the main mould 22, and the second moving mould 27 into a raised position coinciding with the main mould 22 therebelow.

Under these conditions, therefore, while the second moving mould 27 is lowered into coupling with the main mould 22 therebelow, so as the related preforms can in this way be moulded within these coupled moulds, the first moving mould 26 remains in the above cited operational position and the loading unit therebelow (not indicated), whose cooled containers 31 are arranged in a position coinciding with the corresponding plungers or punches 28 and the thereto attached preforms, is raised so as to enable the same preforms to be accomodated in said cooled containers, after which all preforms will then be released from the same containers and transferred on to said loading unit.

Figure 6:
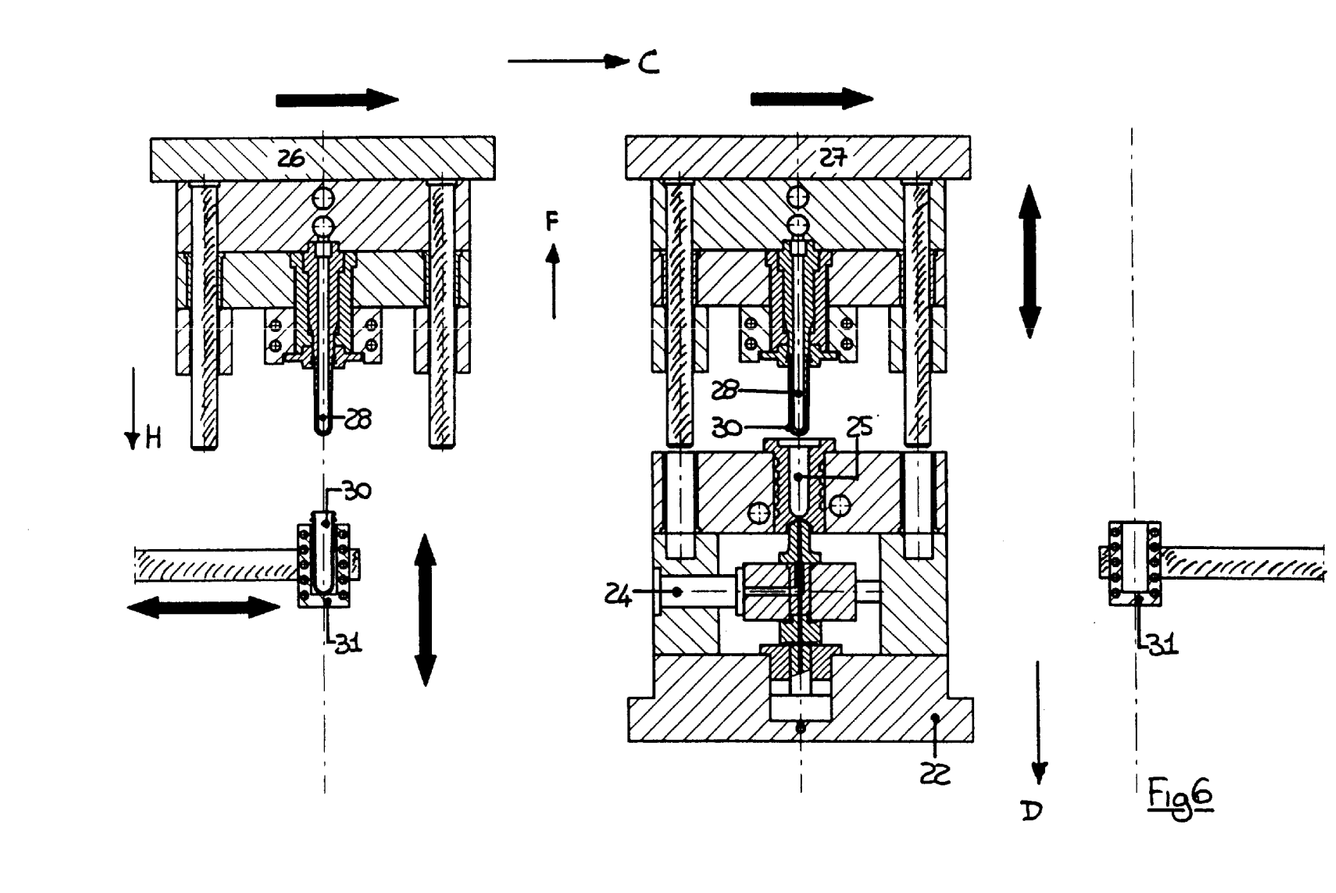

In the remaining FIG. 6 it can finally be noticed that the second moving mould 27 is raised at the end of the moulding of the related preforms, and that such preforms remain therefore attached to the corresponding plungers or punches 28, thereby moving back to the same level as the first moving mould 26 that has in the meanwhile dwelled in the same position it had before; at the same time the loading unit 18 is in turn lowered in the direction H under resulting release of the preforms from said moving mould and transfer thereof onto the same loading unit, while both moving moulds get arranged for a next preform moulding cycle in that both said moving moulds are contemporaneously displaced along the longitudinal direction A, and in the direction C opposite to the previously cited one, after which all of the afore described operational sequences are then repeated.

In this way, therefore, it quite clearly appears that the preform preparation apparatus according to the present invention actually enables the production capacity of the plants for producing bottles or containers of various kind to be significantly increased, while making use of normally sized moulds having the same number of moulding cavities as the currently used moulds, by minimizing downtimes owing to the preforms being able to be moulded alternately with either one of the moving moulds 26 and 27 and the cooling phase of the same preforms being able to be started as soon as such preforms have been moulded, ie. almost as further preforms are being moulded, thereby making it possible for extremely short cycle times to be obtained.

It can of course be appreciated that this apparatus can be used not only in connection with plants for moulding bottles or containers of the above cited kind, but also for producing any other kind of products, even with methods differing from the blow moulding technique, either in combination or not with appropriate plants for manufacturing the same products, without departing from the scope of the present invention.

Figure 2:
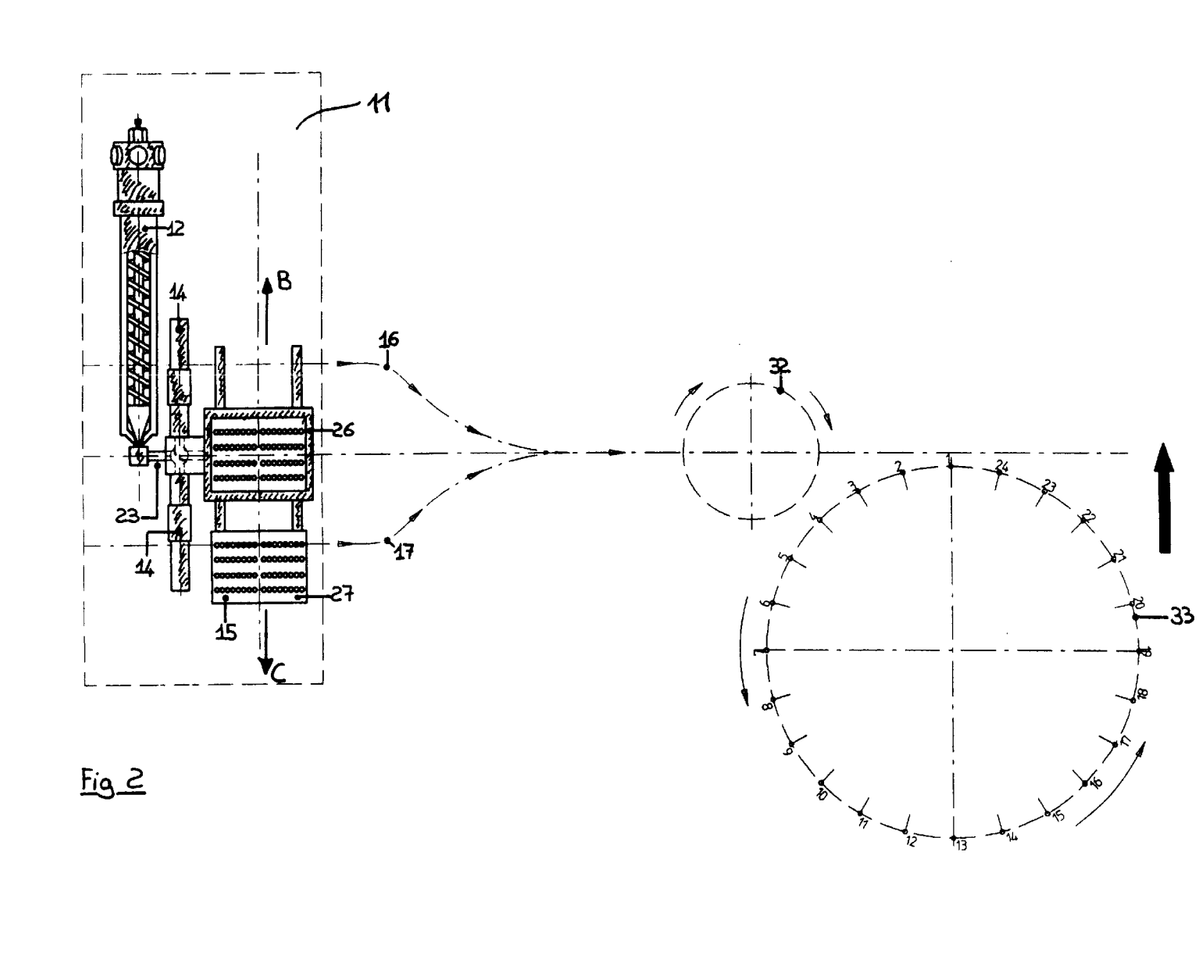
FIG. 2 is a schematical view of the apparatus according to the present invention, as applied to a second kind of plant for the production of bottles or containers.

Considering now FIG. 2, it can be noticed to illustrate a further plant that is traditionally used to produce bottles or containers, and that substantially comprises a moulding station 11 similar to the afore described one, and two production lines 16 and 17 converging in a loading station 32 that communicates with a rotary (ie. carrousel-type) blow moulding station 33. In this case, then, the preforms being moulded in the moulding station 11 are released from the related moving moulds in the same station and selectively transferred by means of corresponding loading units (not shown) along the production lines, from which they are conveyed first to the loading station 32 and, then, from the latter selectively to the rotary blow moulding station 33, while the bottles or containers produced in said blow moulding station are finally ejected from the production plant and packaged for shipping to the customers.

Figure 7:
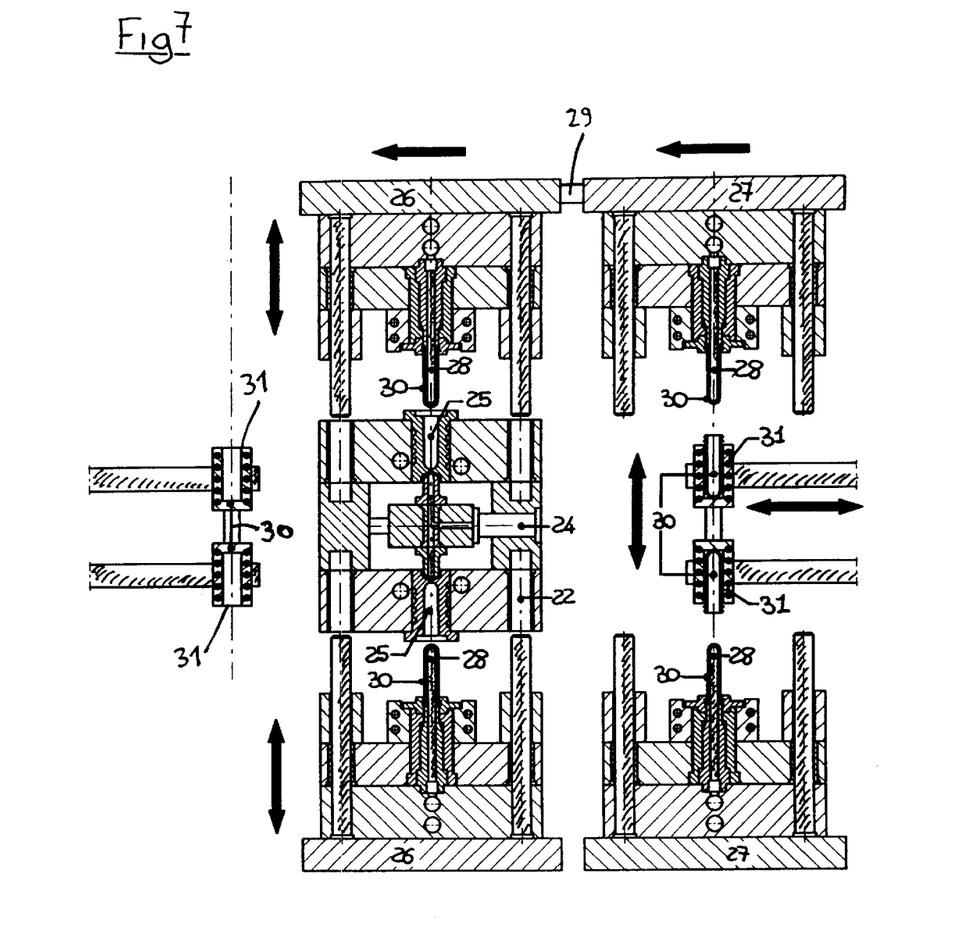
FIG. 7 is a schematical view of the preform preparation apparatus according to the present invention in a second embodiment thereof.

FIG. 7 can now be seen to illustrate the preform preparation apparatus according to the present invention in a second embodiment thereof, in which it can be noticed that said apparatus is again formed by a single main mould 22 which, however, is adapted to perform moulding operations also in combination with a further pair of moving moulds 26 and 27 so as to further increase the production capacity of the associated plant for producing bottles or containers. In this case, then, the main mould 22 is shaped so as to feature two mutually separated series of moulding cavities 25, that are preferably also arranged in mutually opposing positions, so as to favour the moulding operations of the related preforms and preventing each such series of cavities from possibly interfering with the plungers or punches cooperating with the other series of moulding cavities, while said further pair of moving moulds 26 and 27 are in turn arranged in a position opposing the additional series of moulding cavities 25 and symmetrical with respect to the one of the afore described moving moulds, and are in turn associated with guyiding and handling mechanisms that are similar to the afore described ones and are therefore able to determine a similar operation thereof In this case, moreover, each loading unit 18 is provided to include further preform accomodating cavities facing the plungers or punches 28 of said further moving moulds, in which there are inserted corresponding cooled containers 31 performing the same task as described above.

Figure 8:
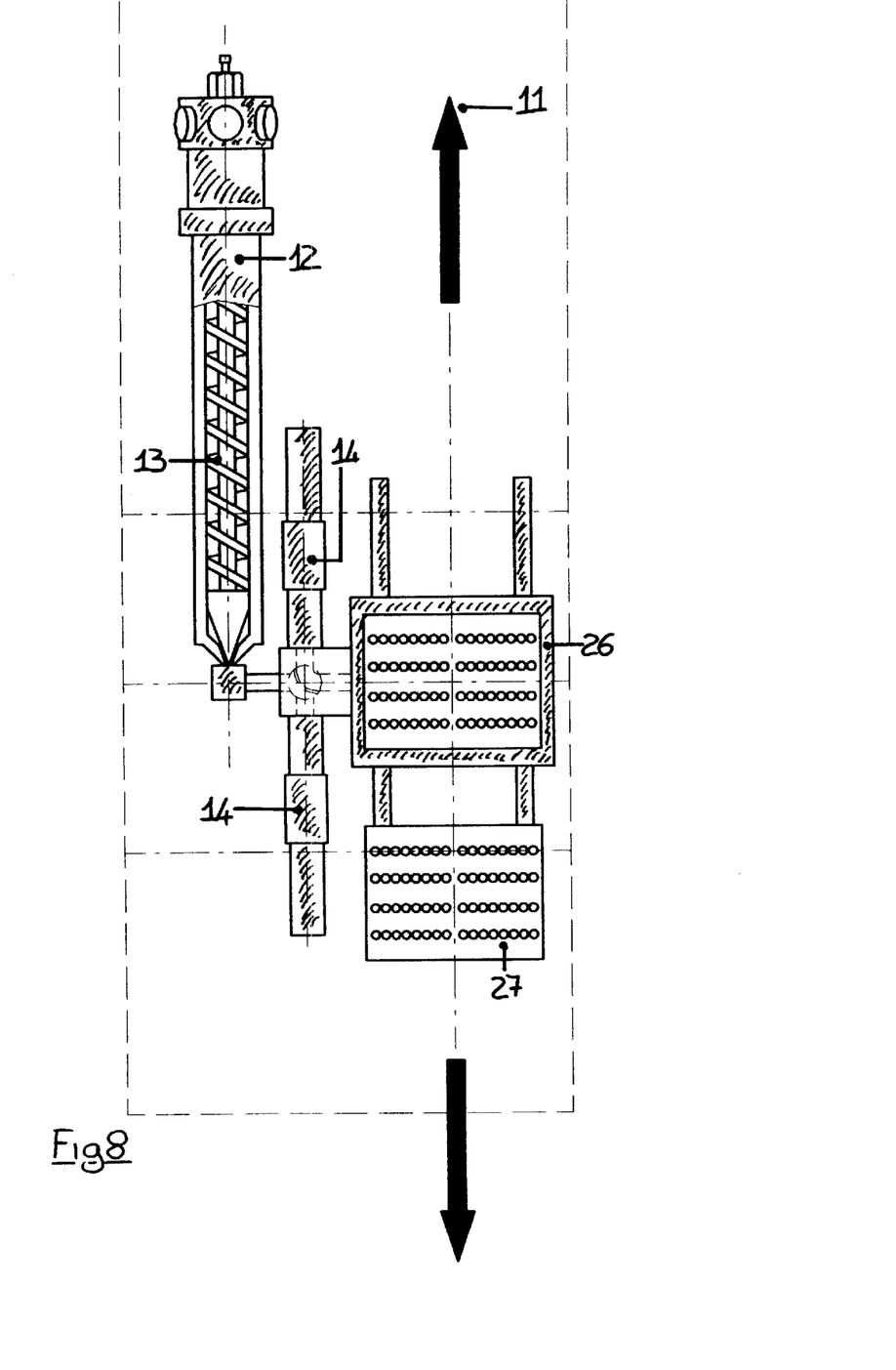
FIG. 8 is a schematical, front cross-sectional view of the preform preparation apparatus according to the present invention in a third embodiment thereof.

FIG. 8 can now be seen to illustrate the preform preparation apparatus according to the present invention in a third embodiment thereof, in which it can be noticed that such an apparatus is constituted solely by theabove described moulding station 11 that is no longer combined with manufacturing plants of the afore described single-stage type, thereby forming an autonomous manufacturing plant of the two-stage type enabling preforms of bottles or containers or products of any other kind to be produced separately, to be then cooled down within corresponding cooled containers 31 inserted on to them, in view of subsequently processing the same preforms in separate machines or plants after the removal thereof from said containers, so as to obtain the desired or required finished products.

What is claimed is:

1. Preform preparation apparatus for manufacturing plant for the production of bottles and containers, comprising moving molds provided with an extruder for the preparation of a mass of molten, plastic material so as to obtain a plurality of preforms therefrom, preform loading units provided with a plurality of cooled metal containers adapted to accommodate said preforms for cooling them, and a conveyor for carrying in sequence said preforms toward an ejection station where the obtained bottles and containers are unloaded from the conveyor, said moving molds being provided with plungers or punches and driven by associated guiding and handling mechanisms and communicating with said loading unit and said conveyor, a stationary main mold provided with molding cavities communicating with said extruder for injecting the molten plastic material forming the preforms therein, said moving molds comprising a first and a second moving mold displaceable separately along a first rectilinear direction in which one of said first and second moving molds is moved to a position coinciding with said main mold so as to be coupled therewith, and the other one of said first and second moving molds is moved to a position non-coinciding with said main mold, and along a second rectilinear direction in which the one moving mold is coupled with said main mold for molding said preforms and the other one of said moving molds with the just molded preforms remains in position for accommodating and cooling said preforms in said containers of said loading unit and for transferring said preforms onto said conveyor wherein said preforms are carried through conditioning stations, temperature stabilization stations and blow molding stations, said main mold being adapted to perform molding operation also in combination with a further pair of moving molds provided with plungers or punches cooperating with corresponding separate molding cavities of said main mold arranged in a mutually opposing relationship to the other molding cavities for forming said preforms.

* * * * *